May 15, 1923.
H. F. HALLER
AUTOMATIC TRAIN STOP AND CONTROL MECHANISM
Filed May 23, 1916     8 Sheets—Sheet 2
1,455,115
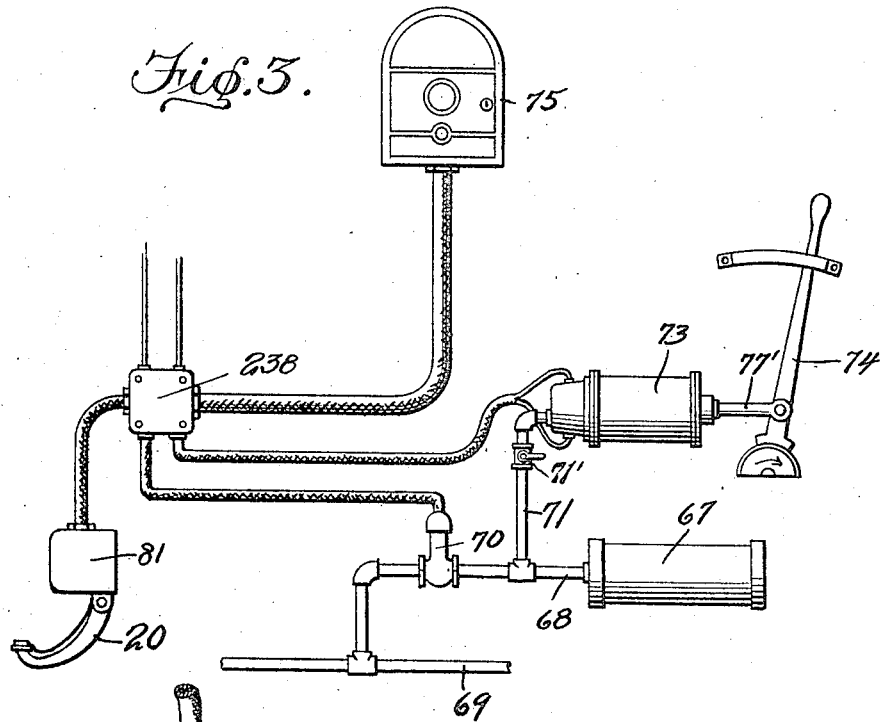
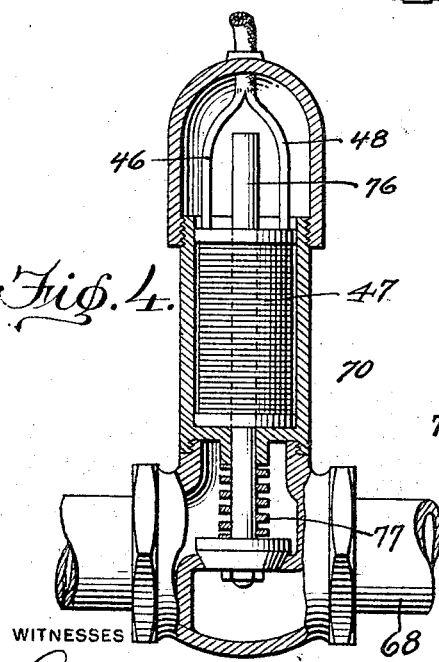
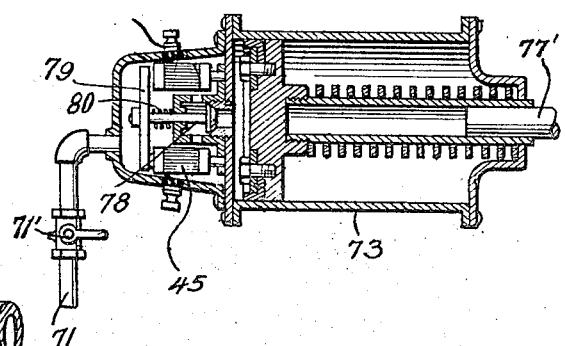
INVENTOR
H. Francis Haller,
BY Richard Bowen.
ATTORNEY
WITNESSES
Carroll Bailey

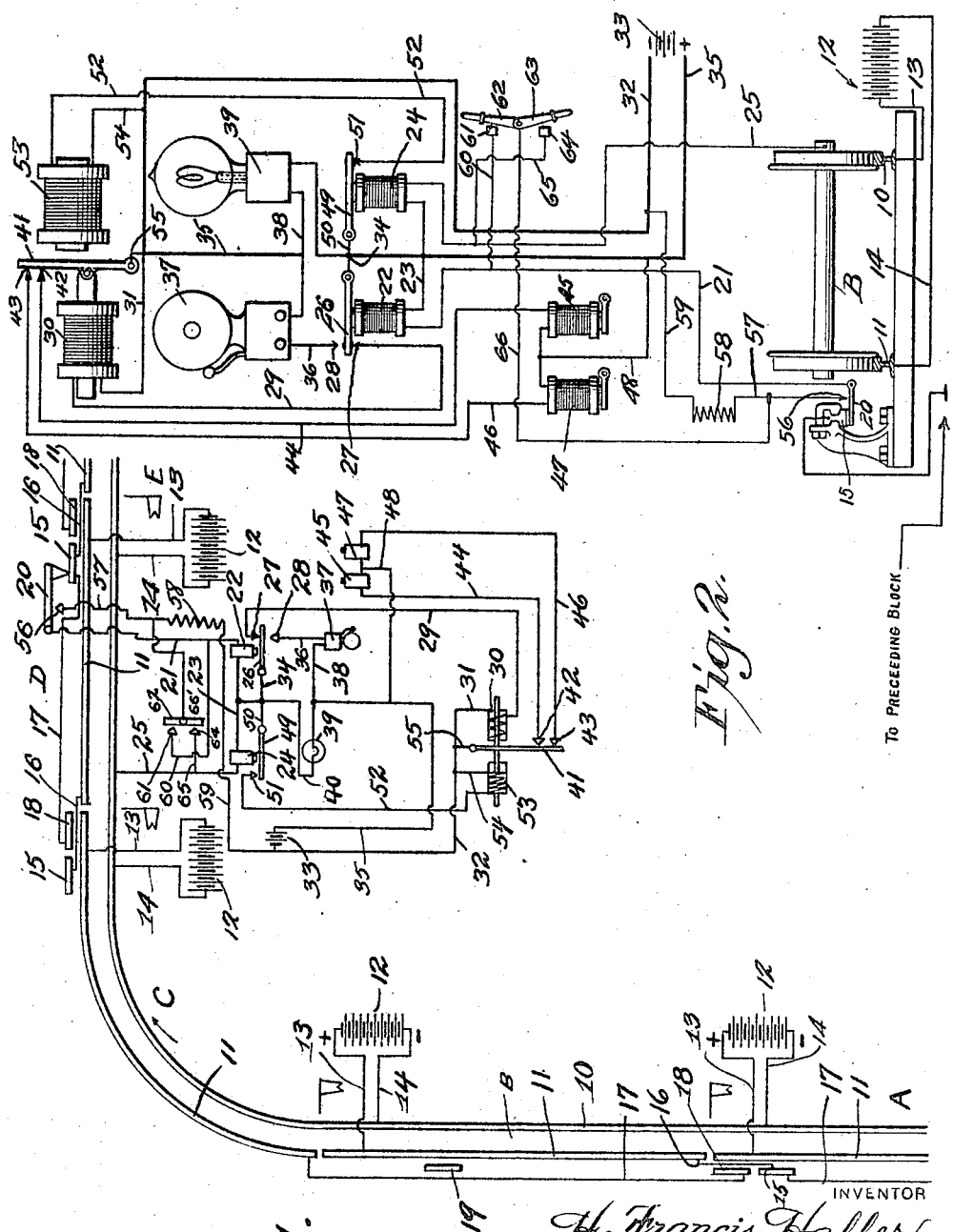

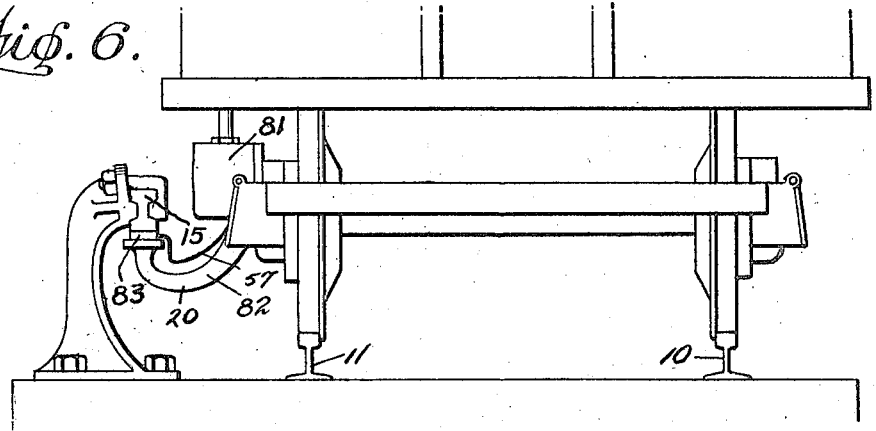
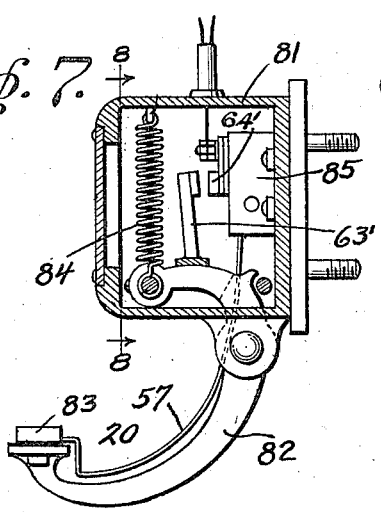
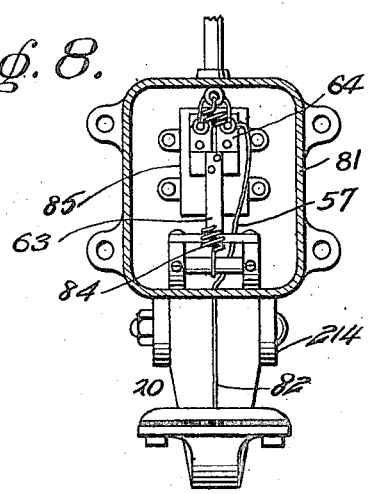
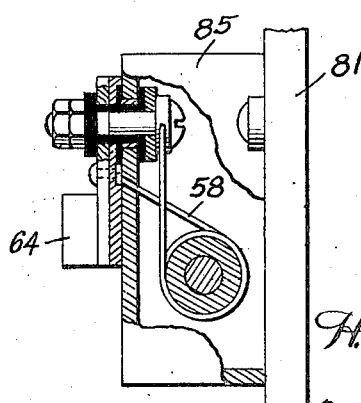

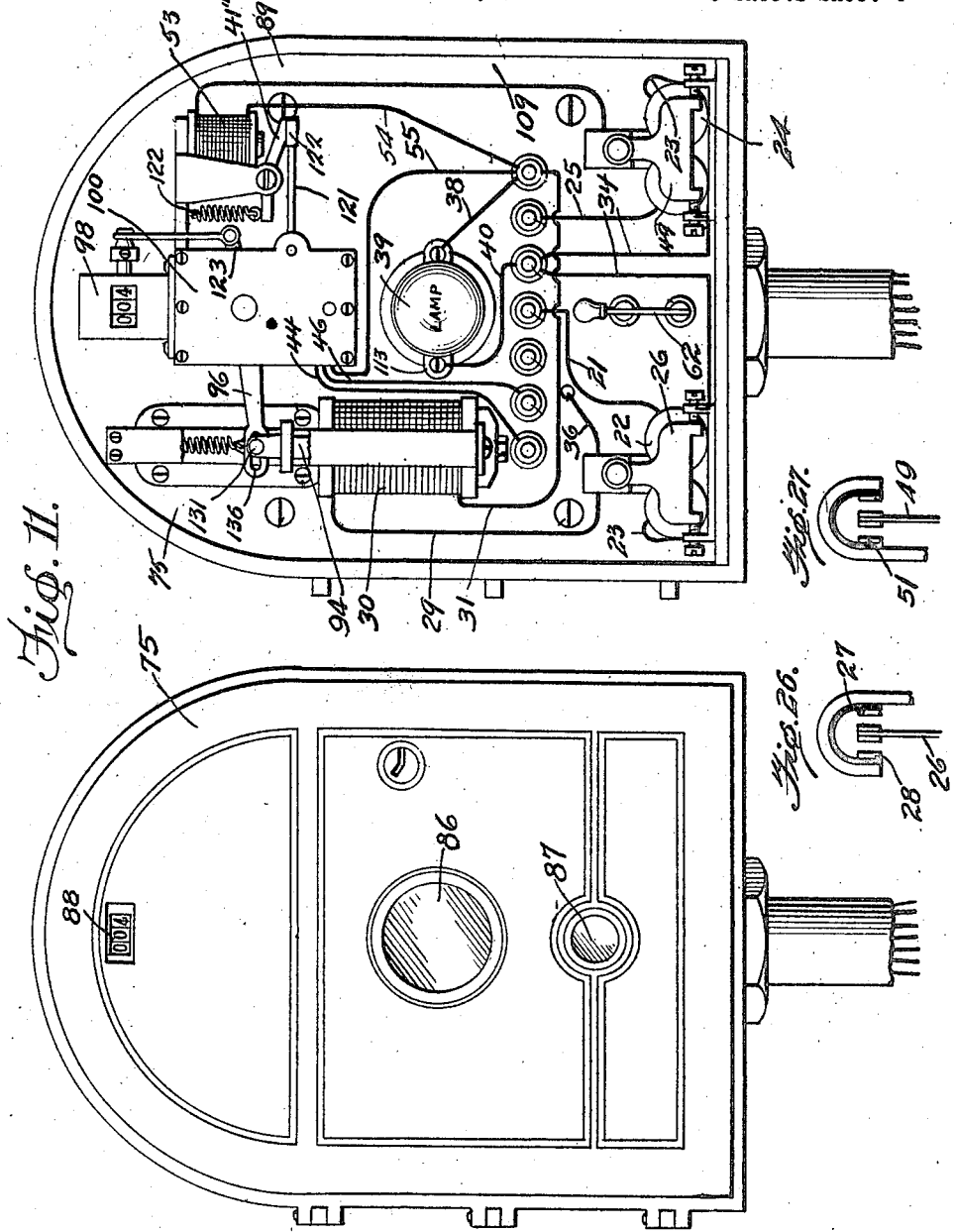

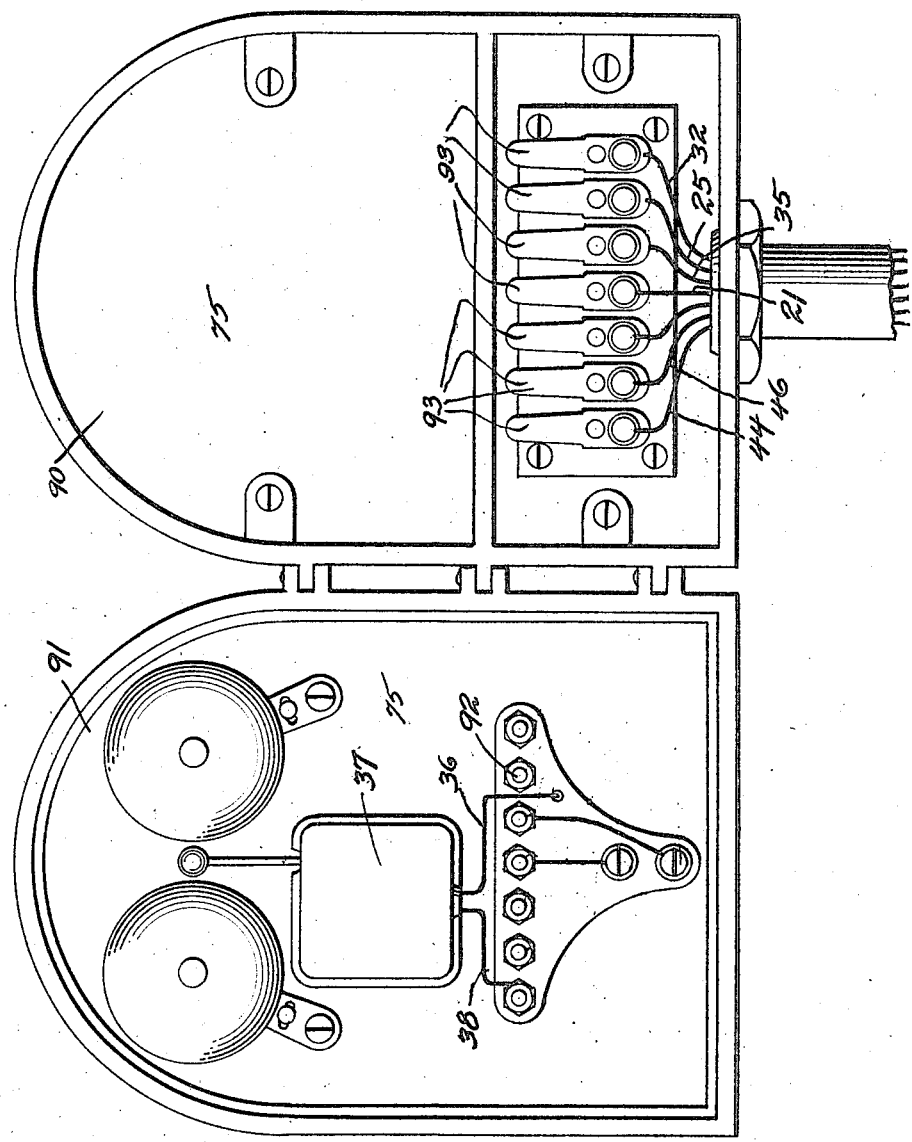

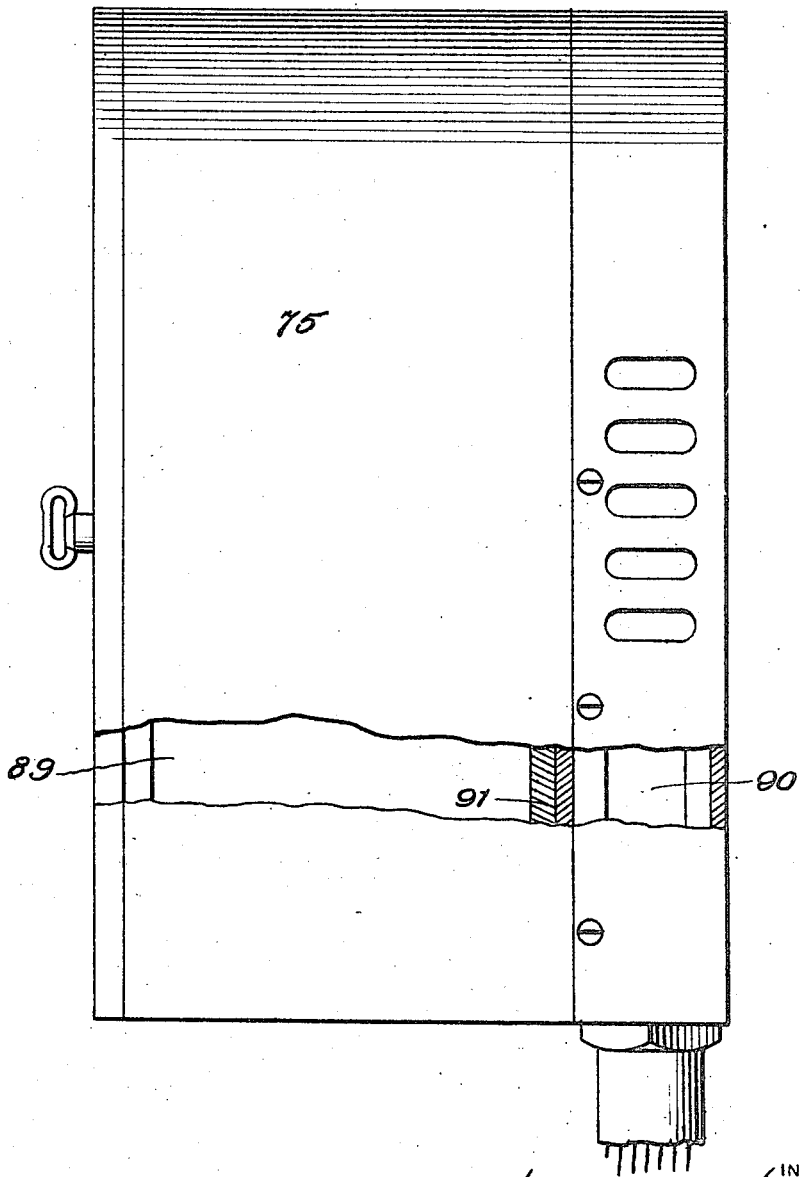

May 15, 1923. 1,455,115
H. F. HALLER
AUTOMATIC TRAIN STOP AND CONTROL MECHANISM
Filed May 23, 1916 8 Sheets-Sheet 7
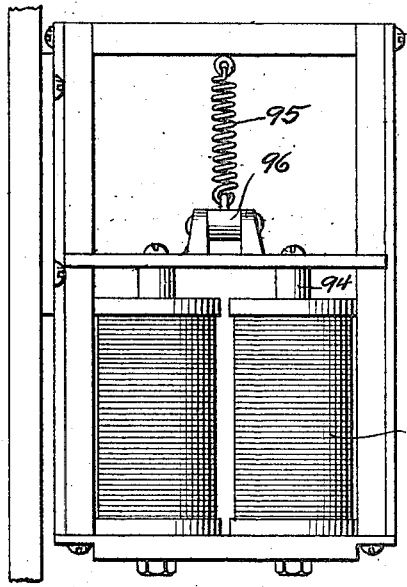
Fig.14. Fig.15. Fig.16. Fig.25.
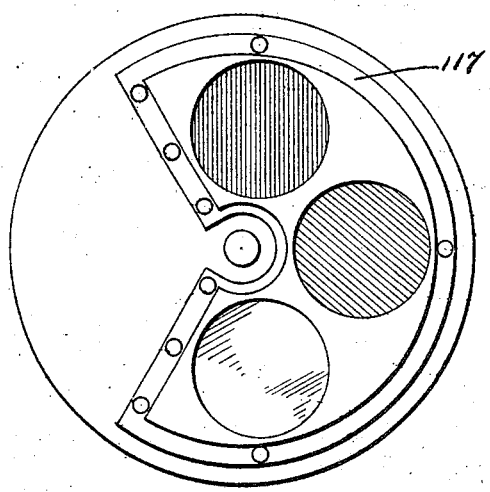 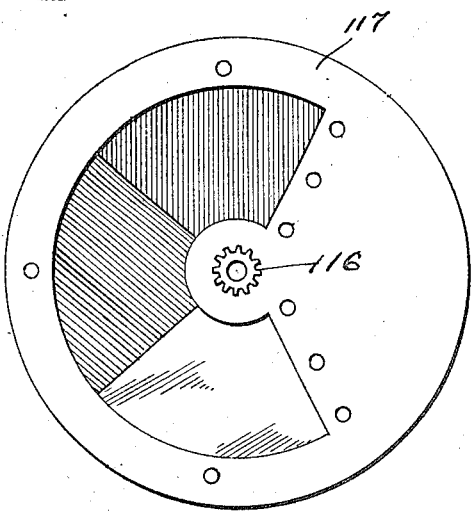
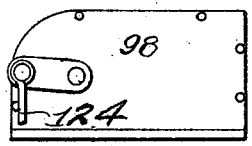 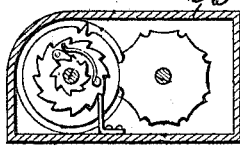
Fig.17. Fig.18.
H. Francis Haller, INVENTOR
WITNESSES
BY ATTORNEY May 15, 1923.  1,455,115
H. F. HALLER
AUTOMATIC TRAIN STOP AND CONTROL MECHANISM
Filed May 23, 1916    8 Sheets-Sheet 8

INVENTOR
H. Francis Haller,
BY Richard B. Owen.
ATTORNEY

WITNESSES
Carroll Bailey
Benj. R. Newcomb

Patented May 15, 1923.

1,455,115

UNITED STATES PATENT OFFICE.

HARRISON FRANCIS HALLER, OF ILION, NEW YORK.

AUTOMATIC TRAIN STOP AND CONTROL MECHANISM.

Application filed May 23, 1916. Serial No. 99,405.

*To all whom it may concern:*

Be it known that I, HARRISON FRANCIS HALLER, a citizen of the United States, residing at Ilion, in the county of Herkimer and State of New York, have invented certain new and useful Improvements in Automatic Train Stop and Control Mechanism, of which the following is a specification.

This invention relates to an automatic train stop mechanism and has reference more particularly to that class of such mechanism which are automatically controlled by electrically actuated means operated selectively, dependent upon a given track condition. That is to say, the system, when used in blocks, is dependent for its operation upon the condition of the track in the next preceding block or upon the condition of the track on the block in which the train is running and the signal given may be either a warning signal or a full stop signal.

One object of the present invention resides in the provision of a third rail block system which is so designed as to be substantially infallible in operation by reason of the fact that, contrary to the usual systems, the controlling devices are included in a normally closed electric circuit and are actuated positively and immediately upon the energization or de-energization of such circuit or upon the short circuiting of the circuit.

Another object resides in providing for the automatic resetting of the system only after the track conditions have again resumed the normal condition and the train is thus permitted to proceed.

A further object consists in providing visual and audible signals for operation in connection with the train controlling means.

And a yet further object resides in providing a system which completely eliminates the use of the objectionable semaphores and the like which, for the efficiency of the system, depend upon the observation of the train crew and which for this reason alone are open to serious objections for any system which depends on the human eye, ear or other human sense is not infallible in operation.

With the above and other objects in view, I will now proceed to describe one form of mechanism which I have illustrated in the accompanying drawings by way of explaining the principles thereof and wherein:

Figure 1 is a diagrammatic view of the track and its electrical arrangement and connections shown in combination with the train carried mechanisms.

Figure 2 is a diagrammatic elevation of the train carried mechanisms in their relation to the track.

Figure 3 is a view showing the general assembly of the various parts carried by the train and operatively associated for controlling the train movement.

Figure 4 is a vertical sectional view through the train stop valve.

Figure 5 is a central sectional view through the speed reducing device.

Figure 6 is an enlarged detail elevation showing the lower part of a car equipped with the contact arm and also showing the third rail.

Figure 7 is a sectional view taken vertically through the contact arm or track lever switch box.

Figure 8 is a sectional view on the line 8—8 of Figure 7.

Figure 9 is a side elevation of the resistance box of the track arm or track lever switch box and showing a portion thereof broken away to disclose details.

Figure 10 is a front elevation of the cab indicator box.

Figure 11 is a front elevation of the front compartment of the cab indicator box.

Figure 12 is an elevation showing the interior of the rear compartment of the cab indicator box.

Figure 13 is a view of the cab indicator box in side elevation.

Figure 14 is a detail view of the cab box operating solenoid.

Figure 15 is a face view of the visual signal or semaphore disc.

Figure 16 is a rear view of the visual signal or semaphore disc.

Figures 17 and 18 are side elevation and sectional elevation respectively of the counter mechanism.

Figure 25 is a detail section through part of the solenoid supporting frame shown in Figure 14.

Figure 26 is a detail view of a certain contact used herewith.

Figure 27 is a detail view of a second contact.

Figure 19:
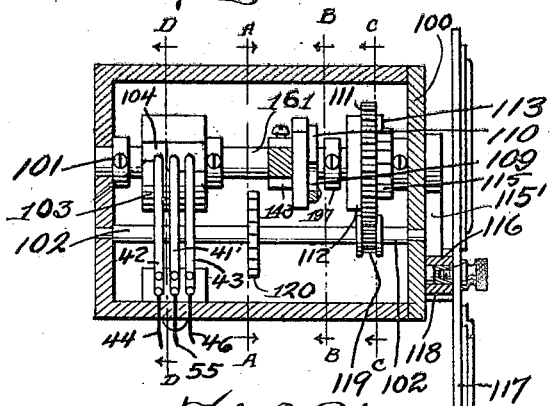
Figure 19 is a sectional front elevation of the contact commutator mechanism.
Figure 20:
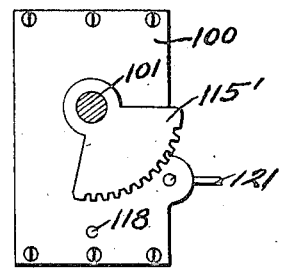
Figure 20 is a side elevation of the contact commutator mechanism with the visual signal disc or semaphore removed.
Figure 21:
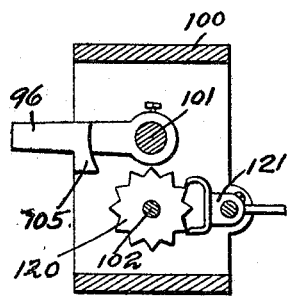
Figure 21 is a sectional view on the line A—A of Figure 19.
Figure 22:
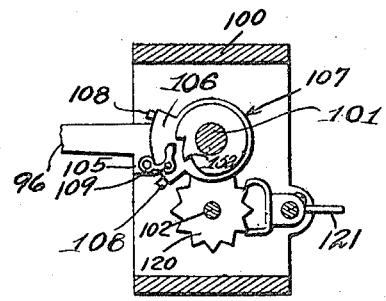
Figure 22 is a sectional view on the line B—B of Figure 19.
Figure 23:
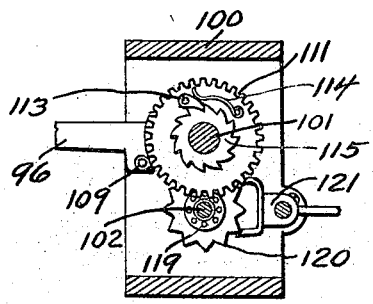
Figure 23 is a sectional view on the line C—C of Figure 19.
Figure 24:
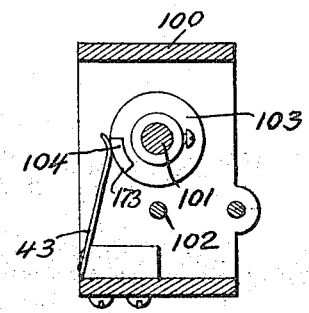
Figure 24 is a sectional view on the line D—D of Figure 19.

Referring now to Figure 1 and disregarding the details of the various parts it will be seen that there is disclosed a track which may be considered to be divided into blocks A, B, C, D and E. This track consists of two rails one of which has the rail sections bonded to form a continuous rail 10 while the sections of the other rail are divided so that there is provided a section 11 for each block. In each of the blocks is provided a track battery 12 having one terminal connected with the rail 11 of that block by a wire 13 while the other terminal is connected by a wire 14 with the continuous track 10. Adjacent the terminal end of each block is provided a contact ramp 15 which is connected by a wire 16 with the rail 11 of the next block ahead and by a wire 17 with a second contact ramp 18 at the end of the next block behind. In certain instances, as shown in block B, the contact ramp 18 is connected by its wire 17 with the rail 11 of the next succeeding block. The purpose of this will be hereinafter explained.

The ramps 18 and 15 are cam ramps for purposes to be hereinafter described, and there is also provided, as for instance at the entry to a curve, a cam ramp 19 which is not electrically connected with any of the other parts of the track.

The various specific constructions of the details will be hereinafter described but in general the train or engine is provided with a contact shoe 20 which is connected by a wire 21 to a magnet 22. From this magnet 22 a wire 23 leads to a second magnet 24 and the other end of the winding of the magnet 24 is grounded as by connection to one of the axles of the train through a wire 25. The magnet 22 controls an armature 26 which oscillates between contacts 27 and 28. To the contact 27 is connected a wire 29 which leads to a solenoid 30, the remaining end of the winding of the solenoid 30 being connected by a wire 31 to a wire 32 leading from a suitable source of power carried by the train and here indicated as a battery 33. It is to be noted that this power source may be a generator and the battery showing is merely typical of any power source. The armature 26 is also connected by a wire 34 with a second power main 35 leading from the other terminal of the battery. From the contact 28 extends a wire 36 which leads to an audible signal indicated by the bell 37. Connected in parallel with this audible signal by a wire 38 is a visual signal indicated by the lamp 39, the visual signal being connected to the main 35 by the wire 40. The magnet 30 controls an armature 41 and adjacent this armature is a pair of contacts 42 and 43. From the contact 42 a wire 44 leads to a magnet 45. Similarly the contact 43 is connected by a wire 46 with a magnet or solenoid 47. These magnets 47 and 45 are connected in parallel by a wire 48 with the main 35. The magnet 24 controls an armature 49 which is connected by a wire 50 with the main 35. This armature opens and closes connection through a contact 51 connected by a wire 52 with a magnet 53 which is in turn connected by a wire 54 with the main 32. It is to be observed that this solenoid 30 and the magnet 53 are opposed, the solenoid being connected to the armature 41 and serving, when energized, to draw the armature towards the contacts 42 and 43 while the magnet 53 serves, when energized, the solenoid being de-energized at the time, to draw the armature out of engagement with the contacts 42 and 43. It is to be observed that the armature 41 is connected by wire 55 with the wire 35. Cooperating with the armature 20 is a contact 56 from which leads a wire 57 to a resistance 58 connected by a wire 59 to the wire 32. Leading from the wire 21 is a wire 60 which is connected to a contact 61 forming part of a switch 62. This switch 62 has a second arm 63 engageable with a contact 64 connected by wire 65 to the ground wire 25. The center of these two switch arms 62 and 63 is connected by a wire 66 to the wire 57 so that if the switch 63 be closed the resistance 58 is grounded.

The mechanical devices carried by the engine include a compressed air receiving tank 67 which is connected by a pipe 68 with the train line 69 common in air brake systems. In the pipe 68 is a certain valve 70 shown in detail in Figure 4 and hereinafter described. Branching from the pipe 68 is a pipe 71 which leads to a cylinder 73 controlling the throttle lever 74 whereby the steam is reduced or shut off. Within the cylinder 73 is a certain electrically controlled valve hereinafter to be described. There is also provided a casing 75 containing most of the electrical controlling apparatus and fully illustrated in Figures 10, 11, 12 and 13, the several parts within this casing being also further illustrated.

Considering now the various details of the invention. In Figure 4 is shown the valve 70 and it is to be noted that the bonnet of this valve is elongated to contain the magnet or solenoid 47, the valve stem 76 forming the core of this solenoid so that when the solenoid is energized the valve is opened. Moreover a spring 77 is provided for closing this valve when the solenoid is de-energized.

In Figure 5 is shown a cylinder 73 and it is to be observed that this cylinder is of the usual air brake type being provided with a piston carrying a piston rod 77' connected to the lever 74, the admission of air to the cylinder from the pipe 71 being controlled by a valve 78 carrying an armature 79 acted upon by the magnet 45 so that so long as this magnet is energized the valve is held closed but when the magnet is de-energized the valve is forced open by a spring 80.

The shoe consists of a casing 81 whereon is pivotally mounted an arm 82 carrying a contact 83 insulated from the arm and having the wire 57 connected thereto. A spring 84 within the casing normally holds the outer end of the arm raised and on this arm is carried the switch lever 63 which, when the arm is raised, engages the contact 64 on an inner casing 85 containing the resistance 58. Thus when the contact 83 engages a ramp rail such as 15, 18 or 19 an arm 82 is depressed and contact is broken between the lever 63' and contact 64'. It is to be observed that the wire 57 is so arranged that current will flow through the resistance when the lever 63 is opened.

In the Figures 10 to 13 inclusive the main part of the electrical apparatus is disclosed. The casing 75 is provided with the usual hinged front having sight openings 86 and 87 therein as well as a third sight opening 88 wherethrough the fingers of a counter may be displayed. This casing is divided into a front compartment 89 and a rear compartment 90 by a hinged partition 91. These compartments are electrically connected by contacts 92 passing through the partition 91 and engaging spring fingers 93 when the partition is closed on the body of the casing. On this partition and the back of the casing are supported the various parts as clearly shown, such parts being connected by the wires as there indicated. It will be noted that the plunger of the solenoid 30 is doubled and that the solenoid cores are doubled as shown in the Figure 14, the plungers being there indicated at 94. These plungers are normally held raised by a spring 95 and connected to the plungers is a lever arm 96 which operates a revolution counter 98. In actual construction the solenoid 30 does not act directly on a lever armature such as shown in diagrammatic view in Figure 1 but this solenoid and the magnet 53 control a piece of apparatus now to be described. Just beneath the counter 98 is provided a casing 100 wherein is mounted a commutator shaft 101. Beneath this commutator shaft is mounted a resetting shaft 102. The lever 96 is revolubly mounted on the shaft 101 and means are provided whereby the movement of this lever under certain conditions rotates the shaft through a certain arc. Fixed on the shaft 101 is an insulating sleeve 103 carrying a contact strip 104. Engaging this contact strip is a middle finger 41' analogous to the armature 41 and at each side of this finger 41' are contacts 42 and 43 here shown in the form of spring strips. The wires connecting these strips are also indicated in Figure 19 and it can thus be seen that the construction is that which is diagrammatically indicated in Figure 1. The end of the lever 96 on the axle 101 carries an offset portion 105 overlapping the tooth sector 106 of a disk 107 revolubly mounted on the shaft 101. The teeth of the sector 106 take the form of pins 108 extending from the periphery and there is also provided on this sector a pawl 109 pivoted to the sector for engagement with the teeth of a ratchet 110 mounted on the shaft 101. Thus, when the lever 96 is moved upwardly the pawl 109 engages the teeth of the ratchet 110 and thereby moves the shaft correspondingly, the extent of movement depending upon the tooth engaged. It is to be understood that the ratchet 110 is immovably fixed on the shaft 101 while the sector and lever are merely fixed against longitudinal movement along said shaft but are free to rotate thereon, the segment being carried by the lever engaging one or the other of the pins 108. It will be noted that the pawl 109 is locked in engagement with the ratchet teeth as the lever moves downward to engage the lower pin 108 and is correspondingly released when the lever strikes the upper pin. Mounted on the shaft 101 is a gear 111 which is revoluble on that shaft. To this gear is connected one end of a coil spring 112, the other end being connected to the shaft. The gear 111 carries a pawl 113 pressed by a spring 114 into engagement with the teeth of a ratchet 115 fixed on the shaft 101. Thus movement of the lever 96 tensions the spring 112. The shaft 101 also carries, exteriorly of the casing 100, a segmental gear 115' which meshes with a pinion 116 carrying a visual signal or semaphore disk 117, the pinion being mounted on a stud shaft 118. This semaphore disk is provided with segments of different colors as shown in Figures 15 and 16 and consequently the extent of movement of the segmental gear 115 will regulate the display of one or the other of said colors, the colored segments being arranged to pass in front of the lamp 39. On the shaft 102 is mounted a pinion 119 meshing with the gear 111. Also there is provided on this shaft an escapement wheel 120 engaged by a pallet lever 121 having at its rear end a pendulum weight 122. In place of the single armature lever 41 the magnet 53 attracts an armature lever 41″ normally held away from the magnet by a spring 122′. The free end of this lever 41′ engages the pendulum weight 122 whenever the magnet is de-energized and thus prevents the ratchet from operating. Conversely, when the magnet is energized, the ratchet will operate. Thus it can be seen that the action of the lever 96 will tension the spring 112 while, unless the resetting magnet 53 is energized, no rotation of either of the shafts will be had. Whenever the magnet 53 is energized then the escapement will be freed for action and the tension of the spring 112 will act to cause rotation of the shafts 101 and 102.

Fixed on the shaft 101 is also a lever 123 which is operatively connected by a link 124 with the counter 98, the latter being of ordinary construction as indicated in general in Figures 17 and 18 and it not being deemed necessary to go into detail description of this part of the device as the same is old and well known.

In the operation of the device let it be supposed that a train is traveling in the direction of the arrow in Figure 1. Under these conditions as long as the shoe 20 is not in contact with the ramp rail current will flow from the battery 33 through the wire 32, wire 59, resistance 58, wire 57, contacts 56, contact 20, wire 21, magnet 22, wire 23, wire 35, back to the battery 33. This will energize the magnet 22 so that current may flow from the battery 33, wire 35, armature 26, contact 27, wire 29, solenoid 30, wire 31, wire 32, back to the battery 33. This will close the armature 41 (the actual effect being to rotate the disk 103 so as to bring one end of the contact 104 into engagement with the fingers 41′ and 43, the remaining end 104 being offset to give 42 engagement later). Under these circumstances current will flow from the battery 33 through wire 32, wire 55, armature 41, contact 43, wire 46, magnet or solenoid 47, wire 48, back to the wire 35 and thence to the battery 33. Thereby the valve 70 will be held open.

Suppose now that the shoe 20 passes over a disconnected ramp such as 19. Under these circumstances contact will be broken between the lever 20 and contact 56 so that the magnet 22 will be de-energized and the armature 26 will engage the contact 28. Under these circumstances current will flow from the battery 33 through the wire 35, wire 34, armature 26, contact 28, wire 36, bell 37, wire 38, wire 32, and back to the battery 33. Thus an indication will be given indicative of the approach of the train to a curve, crossing or other danger point. At the same time the solenoid 30 will be de-energized and consequently the magnet 47 will be de-energized and the valve 70 will close.

It is to be understood that at the time the solenoid or magnet 47 is energized, energization of the solenoid 30 will cause the magnet 45 to be energized in like manner, the circuits being in parallel for the two magnets. This opens the valve 70 and causes the cylinder 73 to move the throttle valve lever 74 to open the throttle. Consequently de-energization of the solenoid 30 will likewise de-energize the magnet 47. Since the passage of the shoe 20 beneath the ramp 19 is but momentary the opening of the valve 70 under de-energization of the magnet 47 will only move the lever 74 to a partial cut-off. This is because admission of air to the cylinder is only momentary so that the piston moves but part of its stroke, it being understood that the parts are properly proportioned to produce this effect. In other words the speed of the train will be slowed down. Now suppose that the shoe 20 passes over one of the energized ramps. At this time it will be true that contact will be broken between 56 and 20 but under these circumstances current will flow from the track battery 12 of the next block ahead as thus. Suppose the train to be in block A then current will flow from the track battery 12 (block B) through rail 11 (block B), ramp 18 with which we may suppose the shoe in contact, contact 20, wire 21, magnet 22, wire 23, magnet 24, wire 25, rail 10, back to the battery 12 (block B). Under these circumstances the effect is the same as when the contacts 56 and 20 are closed. That is to say no signals are displayed or rather the clear signal is indicated by the lamp. Now suppose for any occasion one of the rails breaks, a train short circuits the battery 12 or any like effect. Then immediately current will cease to flow through the wire 21 and since the contacts 56 and 20 are open current cannot flow from the battery 33 through the controlling magnets 22 and 24 and these magnets will open. The effect of this will be to de-energize the magnets 47 and 45 as previously described and in consequence the steam will be shut off by the valve 70 closing causing the train to slow down. As the train passes along it engages the ramp 15 and a second time the contact between 56 and 20 is momentarily broken. Consequently the lever 96 will be pulled further down so that the finger 42 comes into circuit. Thus the magnet 47 will be further energized so as to cause shutting off the steam at the throttle and bringing the engine to a stop. It will be noted that the pipe 71 is provided with a bleeder cock or valve 71′ which may be opened by the engineer to bleed the cylinder 73 and thus restore the throttle to open position. Of course, if the train is already running slowly on approaching a curve this valve 71' may be opened by the engineer to prevent further closing of the throttle by the opening of valve 70.

By means of the lever 62 a circuit may be restablished manually through the control magnets 22 and 24 and when such circuit is restablished through the magnet 24 current will flow from the battery 33 through the wire 32, wire 54, magnet 53, wire 52, contact 51, armature 49, wire 50, wire 35, back to the battery 33. Thus the resetting magnet may be brought into action with the effect of permitting the action of the spring 112 as has been heretofore described.

From the foregoing it will be seen that the magnets 47 and 45 are normally de-energized and consequently the valve 70 is normally closed. If the train passes an energized ramp no effect is produced. If the train passes a de-energized ramp these magnets are energized and the valve 70 is opened so that the pressure from the train pipe effects either partial or full stroke of the piston in cylinder 73 according to the length of time the shoe is in contact with such de-energized ramp. Also, if the throttle is fully open and the shoe passes quickly over a de-energized ramp, the valve 70 will be opened but momentarily so that only sufficient air will be admitted to the cylinder 73 to effect partial closing of said throttle and thus to produce a slowing of the train without stoppage. It is also to be noted that the manual resetting mechanism is only to be used in the event of breakdown of the automatic resetting mechanism.

Having thus described the invention, what is claimed as new, is:—

1. Automatic train control mechanism including a throttle valve, a normally closed electric circuit controlling the throttle valve, and including a circuit breaker, means adjacent the path of the train arranged to engage and open the circuit breaker momentarily and other means adjacent said path arranged to engage and open the circuit breaker and hold the same open a considerable time whereby said means effect respective partial and full closing of the throttle.

2. Automatic train control mechanism including a throttle valve, a normally closed electric circuit controlling the throttle valve, and including a circuit breaker, means adjacent the path of the train arranged to engage and open the circuit breaker momentarily, other means adjacent said path arranged to engage and open the circuit breaker and hold the same open a considerable time whereby said means effect respective partial and full closing of the throttle, and a resetting mechanism for said throttle valve.

3. In a device of the kind described, a circuit including electro-magnetic valve controlling means and a circuit breaker in series, a second circuit including electro-magnetic means for controlling said circuit breaker, a train battery and a second circuit breaker in series, a third circuit including said battery, electro-magnetic means for holding the second circuit breaker closed and a ramp controlled circuit breaker in series, and ramps for opening the ramp controlled circuit breaker.

4. In a device of the kind described, a circuit including electro-magnetic valve controlling means and a circuit breaker in series, a second circuit including electro-magnetic means for controlling said circuit breaker, a train battery and a second circuit breaker in series, a third circuit including said battery, electro-magnetic means for holding the second circuit breaker closed and a ramp controlled circuit breaker in series, ramps for opening the ramp controlled circuit breaker, a track battery, an electrical connection between said battery and ramps, and train supported conductor means for maintaining a circuit from a ramp through the electro-magnetic means for holding the second circuit breaker closed and including contact means on the ramp controlled circuit breaker.

5. In a device of the kind described, a circuit including electro-magnetic valve controlling means and a circuit breaker in series, a second circuit including electro-magnetic means for controlling said circuit breaker, a train battery and a second circuit breaker in series, a third circuit including said battery, electro-magnetic means for holding the second circuit breaker closed and a ramp controlled circuit breaker in series, ramps for opening the ramp controlled circuit breaker, and means for resetting the circuits.

6. In a device of the kind described, a circuit including electro-magnetic valve controlling means and a circuit breaker in series, a second circuit including electro-magnetic means for controlling said circuit breaker, a train battery and a second circuit breaker in series, a third circuit including said battery, electro-magnetic means for holding the second circuit breaker closed and a ramp controlled circuit breaker in series, ramps for opening the ramp controlled circuit breaker, a track battery, an electrical connection between said battery and ramps, train supported conductor means for maintaining a circuit from a ramp through the electro-magnetic means for holding the second circuit breaker closed, including contact means on the ramp controlled circuit breaker and means for resetting the circuits.

7. In a train controlled mechanism a shaft, spring means connected with the shaft for inducing rotative movement to said shaft, a solenoid operatively connected to the spring, means to tension the same, an escapement device connected to said shaft and operable upon rotation of the shaft, a magnet normally preventing operation of said escapement, and train controlling circuits arranged to selectively energize and de-energize the solenoid and to de-energize and energize the magnet.

In testimony whereof I affix my signature in presence of two witnesses.

H. FRANCIS HALLER.

Witnesses:
 LESLIE E. HICKS,
 C. S. DAILY.